United States Patent [19]
McCallion

[11] Patent Number: 5,892,857
[45] Date of Patent: Apr. 6, 1999

[54] ELECTRO-OPTIC COMPOUND WAVEGUIDE INTENSITY MODULAR AND METHOD USING SAME

[75] Inventor: Kevin J. McCallion, Albany, N.Y.

[73] Assignee: Molecular OptoElectronics Corporation, Watervliet, N.Y.

[21] Appl. No.: 786,033

[22] Filed: Jan. 21, 1997

[51] Int. Cl.$^6$ ................................. G02F 1/01; G02B 6/26
[52] U.S. Cl. .................... 385/1; 385/2; 385/5; 385/8; 385/9; 385/14; 385/27; 385/28; 385/30; 385/49; 385/40; 385/132
[58] Field of Search .................... 385/1, 2, 3, 8, 385/9, 14, 15, 39, 40, 41, 49, 132, 27, 28, 30, 5

[56] References Cited

U.S. PATENT DOCUMENTS

| | | | |
|---|---|---|---|
| 4,679,894 | 7/1987 | Pavlath | 385/40 X |
| 4,721,352 | 1/1988 | Sorin et al. | 385/40 X |
| 4,722,583 | 2/1988 | Stewart | 385/40 X |
| 4,842,358 | 6/1989 | Hall | 385/40 X |
| 4,895,422 | 1/1990 | Rand et al. | 385/1 X |
| 5,007,695 | 4/1991 | Chang | 385/11 X |
| 5,067,788 | 11/1991 | Jannson et al. | 385/2 |
| 5,265,178 | 11/1993 | Braun et al. | 385/24 |
| 5,396,362 | 3/1995 | Yakymyshyn et al. | 359/245 |

OTHER PUBLICATIONS

K. McCallion, W. Johnstone, and G. Fawcett, "Tunable in–line fiber–optic bandpass filter", Optics Letters, vol. 19, No. 8, pp. 542–544, Apr. 15, 1994.

W. Johnstone, G. Thursby, D. Moodie, R. Varshney, and B. Culshaw, "Fibre Optic Wavelength Channel Selector With High Resolution", Electronics Letters, vol. 28 No. 14, pp. 1364–1365, Jul. 2, 1992.

W. Johnstone, G. Thursby, R. Varshney, D. Moodie, K. McMallion, B. Culshaw, "Wavelength Selective Optical Fibre Components Using Solid State Wavelength Overlays", Fibre Optic Components and Reliability, SPIE, vol. 1580, pp. 224–229, Sep. 1991.

W. Johnstone, S. Murray, G. Thursby, M. Gill, A. McDonach, D. Moodie, and and B. Culshaw, "Fibre Optic Modulators Using Active Multimode Waveguide Overlays", Electronics Letters, vol. 27 No. 11, pp. 894–896, May 23, 1991.

K. McCallion, W. Johnstone and G. Thursby, "Investigation of Optical Fibre Switch Using Electro–Optic Interlays", Electronics Letters, vol. 28 No. 4, pp. 410–411, Feb. 13, 1992.

C.A. Miller, M.C. Brierley, and S.R. Mallinson, "Exposed–core single–mode–fiber channel–dropping filter using a high–index overlay waveguide" Optics Letters, vol. 12, No. 4, Apr. 1987.

(List continued on next page.)

*Primary Examiner*—Brian Healy
*Attorney, Agent, or Firm*—Heslin & Rothenberg, P.C.

[57] ABSTRACT

An electro-optic modulator is disclosed in the form of a compound waveguide device having a channel waveguide in optical proximity to an elongate waveguide propagating an optical signal therein. The channel waveguide includes a coupling surface through which optical energy is evanescently coupled to or from the optical signal propagating in the elongate waveguide. The channel waveguide is shaped to confine distribution of the optical energy therein along axes transverse to the axis of propagation of the optical energy. Transverse diffraction of the optical energy within the channel waveguide is thereby limited. The channel waveguide is formed from an electro-optically active material, and modulation of the optical signal propagating in the elongate waveguide is effected using the evanescent coupling effect between the two waveguides. In one embodiment, the elongate waveguide is a side-polished fiber-optic waveguide.

32 Claims, 7 Drawing Sheets

OTHER PUBLICATIONS

G. Fawcett, W. Johnstone, I. Andonovic, D.J. Bone, T.G. Harvey, N. Carter and T.G. Ryan, "In–Line Fibre–Optic Intensity Modulator Using Electro–Optic Polymer", Electronics Letters, vol. 28 No. 11, pp. 985–986, May 21, 1992.

S. Creaney, W. Johnstone, and K. McCallion, "Continuous–Fiber Modulator with High–Bandwidt Coplanar Strip Electrodes", IEEE Photonics Technology Letters, vol. 8 No. 3, Mar. 1996.

Krassimer P. Panajotov, "Evanescent field coupling between a single–mode fiber and a planar waveguide with absorption or gain", J. Opt. Soc. Am. B, vol. 13 No. 11, pp. 2468–2476, Nov. 1996.

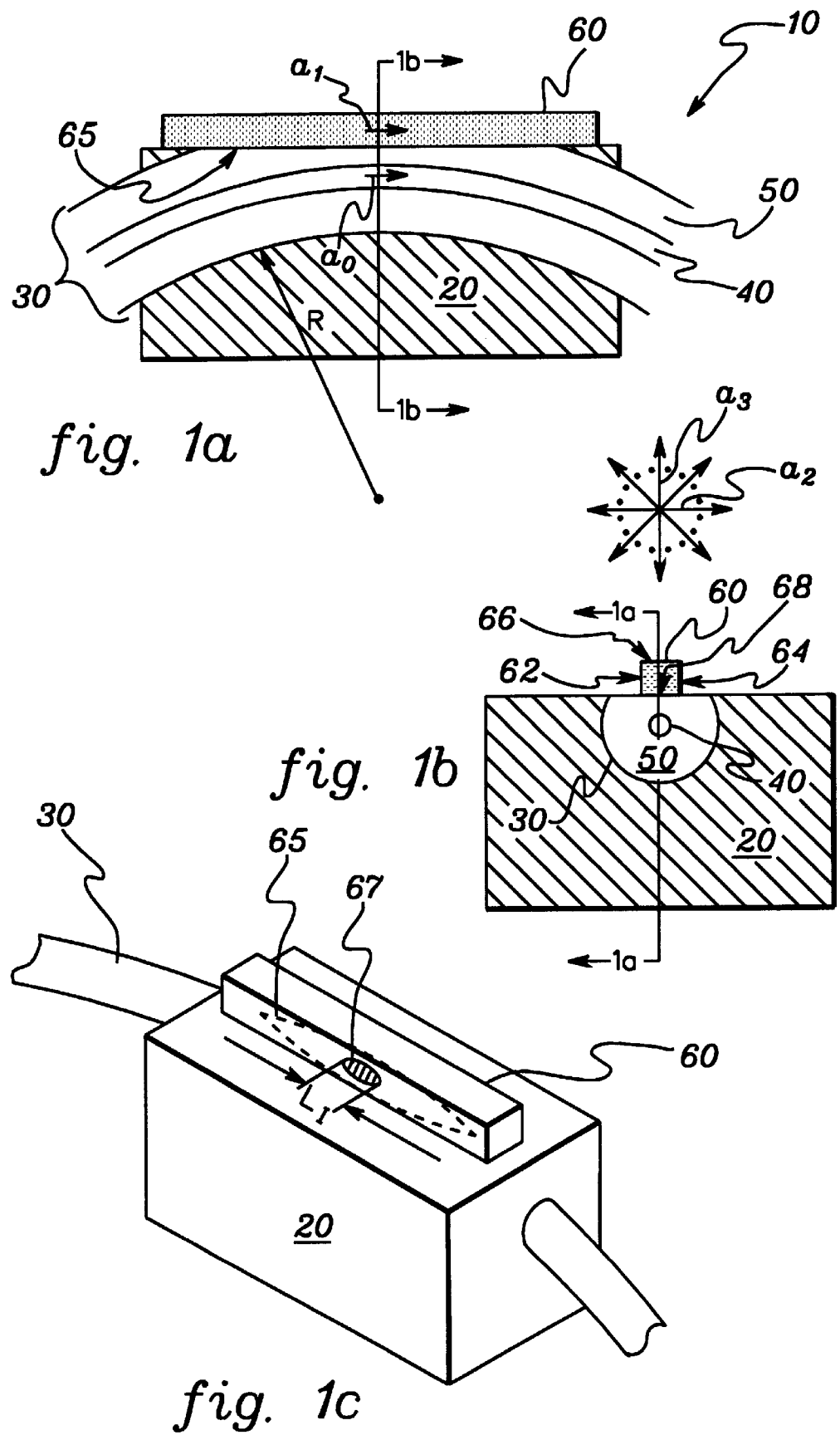

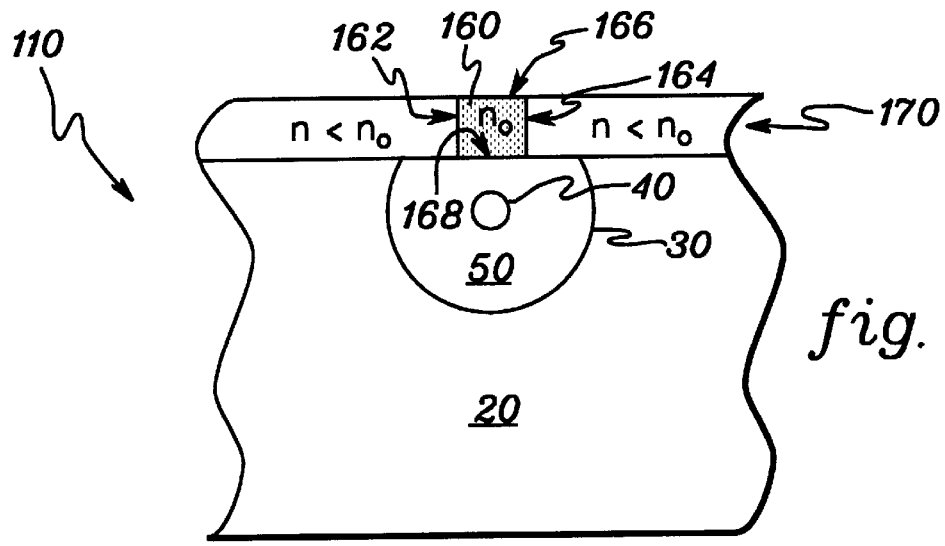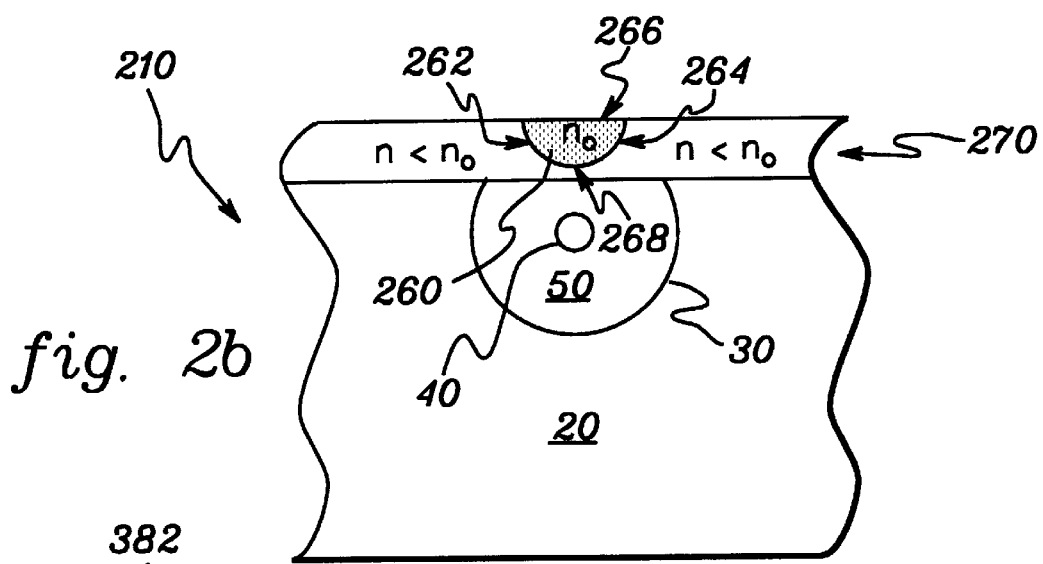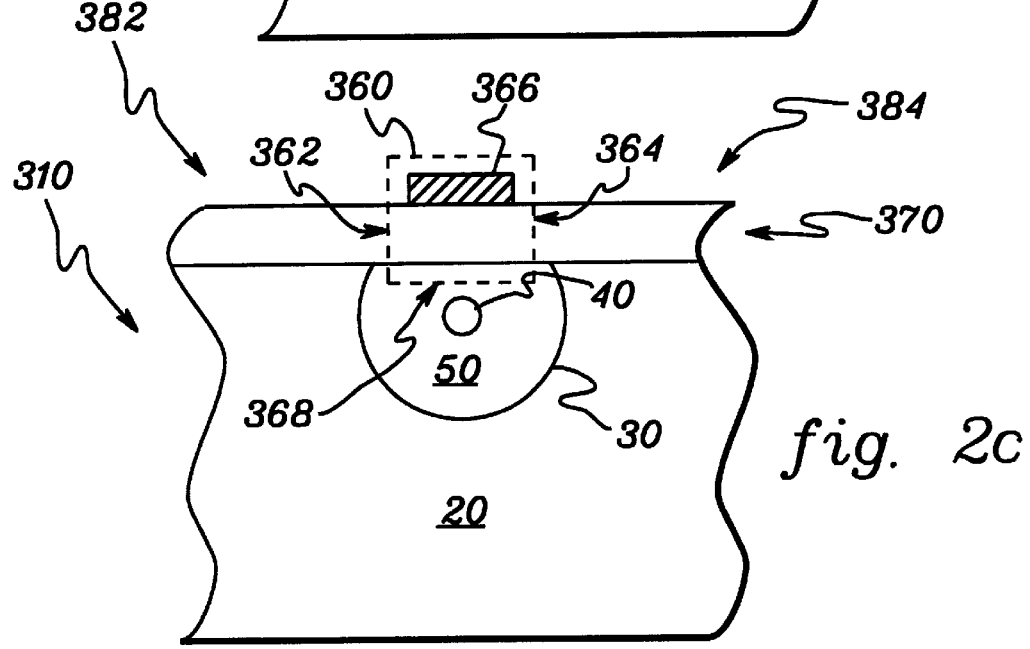

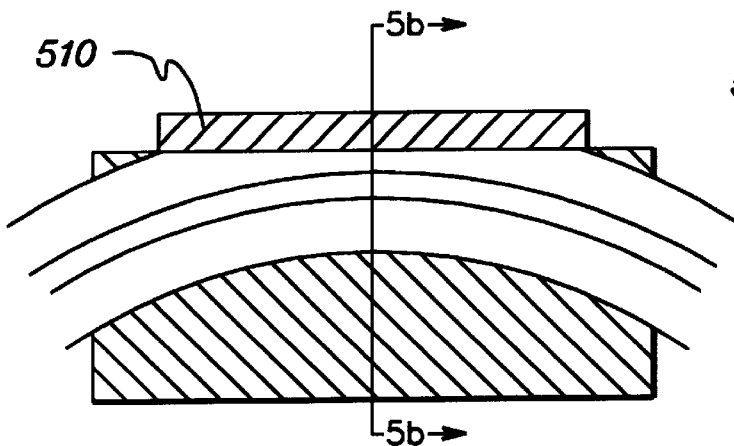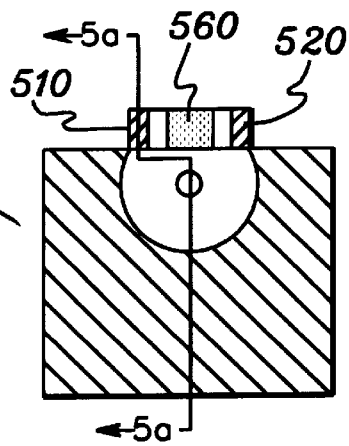
fig. 5a    fig. 5b
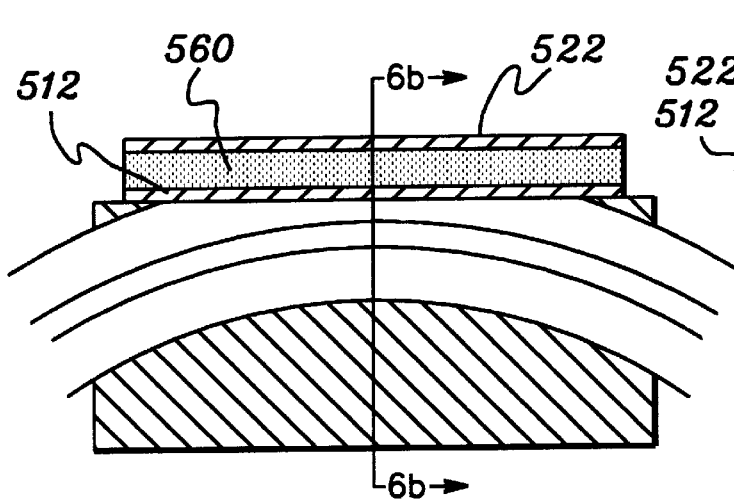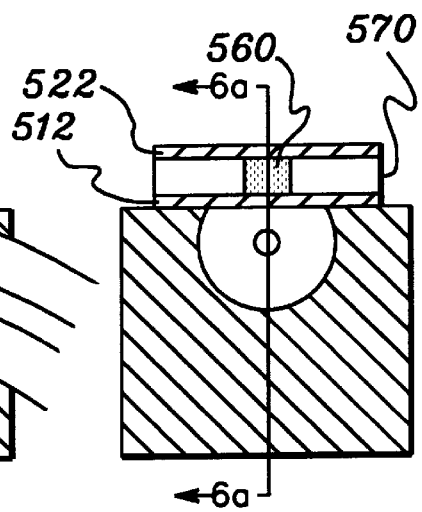
fig. 6a    fig. 6b
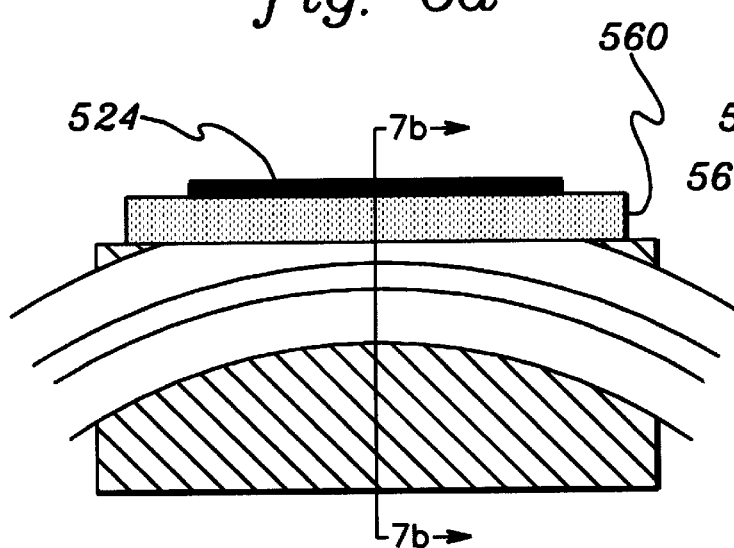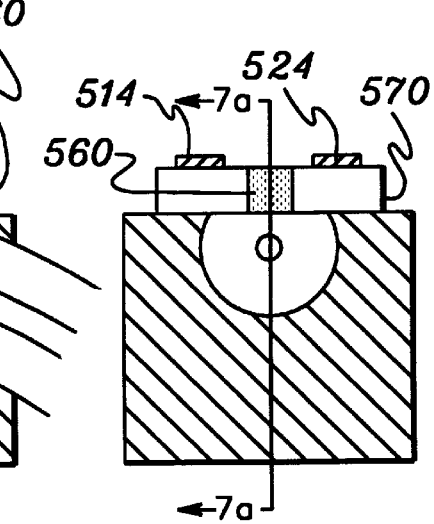
fig. 7a    fig. 7b

ELECTRO-OPTIC COMPOUND WAVEGUIDE INTENSITY MODULAR AND METHOD USING SAME

RELATED APPLICATION INFORMATION

This application relates to the following commonly assigned, concurrently filed U.S. Patent Applications:

U.S. patent application Ser. No. 08/785,871, filed Jan. 21, 1997, pending, Attorney Docket No. 0953.022, and entitled "Compound Optical Waveguide and Filter Applications Thereof."

U.S. patent application Ser. No. 08/786,047, filed Jan. 21, 1997, pending, Attorney Docket No. 0953.023, and entitled "Optical Amplifier and Process for Amplifying an Optical Signal Propagating in a Fiber Optic."

Each of these applications is hereby incorporated by reference herein in its entirety.

TECHNICAL FIELD

This invention relates in general to optical signal transmission, and in particular to methods and systems for electro-optically coupling optical energy to or from a transmitting waveguide using another waveguide placed in proximity thereto and thereby electro-optically modulating the optical signal in the transmitting waveguide.

BACKGROUND OF THE INVENTION

A compound waveguide device contains a first optical waveguide, and a second optical waveguide placed in optical proximity to at least a portion of the first waveguide. The second waveguide (possibly electro-optically tunable), placed in optical proximity to the first waveguide, can be used for the coupling of optical energy, within a selectable spectral band, from the first waveguide to the second. The coupling effect between the first and second waveguides can be utilized in a variety of optical signal processing applications.

For example, in some filtering applications, efficient recollection of the coupled optical energy for further use (e.g., in signal detection or demodulation, source stabilization feedback) is required. Multiple wavelength bands may be transmitted through the first waveguide, in a wavelength division multiplexing (WDM) system, in which case the second waveguide can be used as a filter to extract information carried in one of the bands. If an electro-optic material (e.g., $LiNbO_3$) is used to form the second waveguide, then the device can be configured as an active, electro-optically tunable filter. In another embodiment, the geometric and physical properties of the second waveguide itself may result in a useful passive filter inherently tuned to a particular wavelength of interest.

In another example, if an electro-optic material is used to form the second waveguide, the device can be configured as an intensity modulator for a fixed wavelength signal transmitted through the first waveguide. By applying an electric field to the second waveguide using, for example, a suitable high-speed electrode pattern, a refractive index change is induced in the second waveguide and a corresponding shift in the spectral response results. The transmitted intensity of the signal in the first waveguide can therefore be modulated by the shifting spectral response, resulting in a modulator which can operate up to microwave frequencies.

Depending upon the particular application, different coupling characteristics between the waveguides are required. However, certain improvements to these characteristics are commonly desired in many applications. Diffractive losses in the second waveguide itself, while in certain applications useful, in others may adversely affect the shape of the spectral response of the device. For example, eliminating diffractive losses is often desirable because recollection efficiency in a signal detection or demodulation device can be thereby improved.

The operation of the device is determined by its intrinsic spectral response and the electric field applied to the second, electro-optically tunable waveguide. In a filtering context, sharpening the coupling resonance, in either a bandpass or bandstop configuration, improves the spectral selectivity of the device. In a modulation context, steepening the edge of the coupling resonance can increase a modulation of an optical carrier transmission for a given amount of device tuning about the carrier wavelength. Therefore, for a given transmission modulation, steepening the coupling resonance lowers the operating voltage of the device. In either context, altering the geometry of the second, electro-optically tunable waveguide to increase the applied electric field and its distribution therein increases device tunability, and thereby improves its performance.

Therefore, what is required, is a compound waveguide device with improved tunability and which offers other improvements to known devices. In the filter context, preventing unnecessary diffractive losses in the second waveguide improves spectral selectivity and secondary coupling. In the modulator context, steepening the resonance edge increases device responsivity which allows for lower drive voltages.

SUMMARY OF THE INVENTION

The above requirements are satisfied by the instant invention, which in one aspect is an optical modulator including a substrate for holding at least a portion of a first, elongated waveguide propagating an optical signal along a propagation axis thereof. A second, channel waveguide is positioned in optical proximity to the portion of the first waveguide and has a first, propagation axis aligned with the propagation axis of the portion of the first waveguide. The channel waveguide further includes a coupling surface through which optical energy is coupled to or from the optical signal propagating in the first waveguide to thereby modulate the optical signal. The channel waveguide is shaped to confine distribution of the optical energy therein along axes of the channel waveguide transverse to its first, propagation axis.

Various embodiments of the second, channel waveguide are disclosed herein, including a first embodiment in which the channel waveguide is formed as an optically bounded region within a layer disposed over the substrate. The region has an index of refraction different than that of other regions of the layer, and optical boundaries formed by the intersections of the region and the other regions confine distribution of the optical energy within the channel waveguide along the axes of the channel waveguide transverse to its first, propagation axis. In another embodiment, the channel waveguide is an optically bounded region within a layer disposed over the substrate, and the region is formed by a surface relief structure on the layer. The surface relief structure forms optical boundaries to confine distribution of the optical energy within the channel waveguide along the axes of the channel waveguide transverse to its first, propagation axis.

The first, elongated waveguide may be a fiber waveguide, wherein the portion of the first waveguide is a side-polished portion of the fiber waveguide. The coupling surface of the channel waveguide evanescently couples the optical energy from the side-polished portion of the fiber waveguide.

The channel waveguide is normally formed from an electro-optically active material and the modulator usually includes at least one electrode positioned to apply an electric field to the channel waveguide to electrically control the coupling of the optical energy by the channel waveguide, to thereby modulate the optical signal in the first waveguide. In the case where the optical signal is a fixed wavelength signal, the electric field is applied to control a coupling wavelength at which the coupling of the optical energy by the channel waveguide occurs. The control of the coupling wavelength about the fixed wavelength of the optical signal by the electric field imparts an intensity modulation upon the optical signal.

In an enhanced embodiment, the second, channel waveguide comprises a multimode waveguide having a high order mode, and the electric field controls the coupling wavelength at which the high order mode index corresponds to the first waveguide's mode index, and thereby imparts the intensity modulation upon the optical signal.

The modulator is formed such that the optical energy is coupled to or from the first waveguide by the second, channel waveguide along an interaction area between the channel waveguide and the first waveguide. The optical energy is coupled according to an oscillating energy transfer function, wherein an interaction length of the interaction area is determined as a function of the oscillating energy transfer function. In one embodiment, the interaction length of the interaction area is substantially equal to an odd multiple of one-half of the period of the oscillating energy transfer function, such that the optical energy coupled from the optical signal by the channel waveguide rises from a near minimum to a near maximum value along the interaction length.

In another aspect of the invention, an optical modulator is provided for modulating an optical signal propagating along a propagation axis of a side-polished fiber optic by coupling optical energy to or from the optical signal. The optical modulator includes a multimode channel waveguide having a propagation axis alignable with the propagation axis of the side-polished fiber optic. The multimode channel waveguide includes a coupling surface through which the optical energy is coupled to or from the optical signal propagating in the side-polished fiber optic. The multimode channel waveguide confines distribution of the optical energy therein along axes transverse to its propagation axis.

In a method aspect of the present invention, a method for modulating an optical signal propagating along a first propagation axis of first, elongated waveguide is provided. Optical energy is coupled to or from the optical signal by placing a second, multimode channel waveguide in optical proximity to a portion of the first waveguide, and evanescently coupling the optical energy to or from the optical signal through a coupling surface of the second, multimode channel waveguide.

The modulator and associated methods discussed above improve upon prior techniques by steepening the resonance edges of the coupling waveguide, thereby increasing responsivity and allowing for lower drive voltages of the modulating signal.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

FIGS. 1a–c are cross-sectional and perspective views of a compound waveguide having a channel waveguide placed in optical proximity to a side-polished fiber optic, in accordance with the principles of the present invention;

FIGS. 2a–c are cross-sectional views of alternate embodiments of the compound waveguide wherein the channel waveguide is formed within a layer overlaying a substrate holding the fiber optic;

FIGS. 5a–b are cross-sectional views of a compound waveguide having electrodes placed along the side surfaces of the channel waveguide thereof;

FIGS. 6a–b are cross-sectional views of a compound waveguide having transparent electrodes placed above and below the channel waveguide thereof;

FIGS. 7a–b are cross-sectional views of a compound waveguide having co-planar electrodes placed over the channel waveguide thereof;

DETAILED DESCRIPTION OF THE PREFERRED EMBODIMENT(S)

Figure 3:
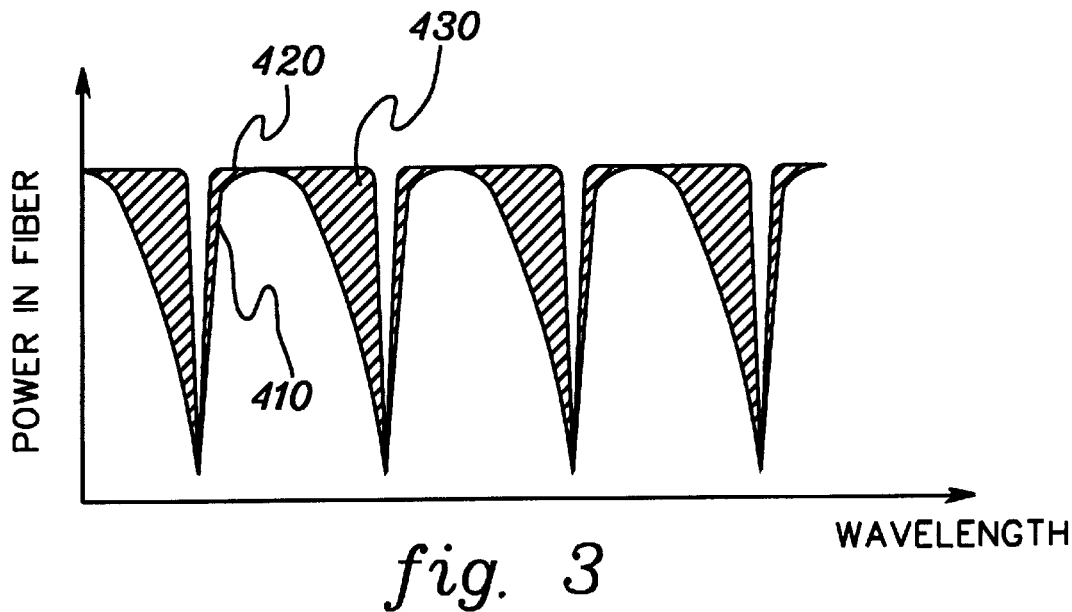
FIG. 3 is a plot of the spectral responses of the channel waveguide disclosed herein and a planar or slab waveguide.

As discussed above, an optical waveguide (possibly electro-optically tunable) can be a useful device for the selective coupling of a specific optical carrier band from a portion of a second broad-band or multi-band waveguide placed in optical proximity thereto. For example, the presence of a high index (e.g., >about 1.45), multi-mode waveguide in optical proximity to a portion of a single-mode optical fiber can result in a predictable spectral response of the carrier band, following its interaction with the waveguide. When a single-mode optical fiber, side-polished close to the core, is placed in proximity to such a high index, "overlay" waveguide, the resultant spectral response is that of a periodic bandstop wavelength filter. In this configuration, the waveguide is positioned in optical proximity to the fiber such that only those frequencies (wavelengths) of the optical carrier within the spectral resonances of the device evanescently couple to the overlay.

This results in a non-invasive coupler which does not suffer the insertion losses normally associated with in-line couplers which interrupt the fiber core itself.

With reference to FIGS. 1a–c, and in accordance with the present invention, a compound waveguide device 10 includes a substrate 20 having a waveguide 30 running therethrough. (Like reference numerals are used for like elements throughout the drawings.) In the exemplary embodiment of FIGS. 1a–c, waveguide 30 comprises a single-mode fiber optic cable having a core 40 encased by cladding 50. The fiber transmits an optical signal through its core along propagation axis $a_0$. When such a single-mode optical fiber is side-polished close to its core (e.g., to within 5 μm), and optically coupled to "overlay" waveguide 60, the device spectral response is that of a periodic bandstop wavelength filter, as discussed above. In accordance with the invention, a channel overlay waveguide 60 is provided for optical coupling to the evanescent field exposed by the side-polishing of fiber waveguide 30. Evanescent coupling occurs along an optical interaction area 67 (having interaction length $L_I$) between the channel waveguide 60 and fiber waveguide 30, which in exemplary device embodiment 10 is substantially determined by the size of the intersection 65 of the planar polished surface of fiber waveguide 30 and the lower, coupling surface of channel waveguide 60. Interaction length $L_I$, is typically much smaller than the length of the channel waveguide. (Though FIGS. 1a–c depict a direct contact between waveguides 30 and 60, it should be understood by those skilled in the art that intervening adhesive, transparent electrodes, and/or index matching layers may be present at this interface.) The elongated shape of channel waveguide 60 provides a propagation axis a, therein which is longitudinally aligned with propagation axis $a_0$ of fiber waveguide 30.

A channel waveguide differs from a planar or slab waveguide in that the optical energy is transversely confined in two transverse directions in the former, and in only one transverse direction in the latter. As an example, for a 10 μm thick slab of index 2.2 surrounded by an index of 1.45, at a wavelength of 1.31 μm, there are 25 modes in the transverse direction perpendicular to the slab, and an infinite number of modes in the transverse direction along the slab. In a similar 10 μm by 10 μm channel waveguide, there are 25 modes in both transverse directions. This change in geometry and mode structure directly affects the propagation of an optical signal within the waveguide, and the coupling of one waveguide to another.

Evanescent coupling occurs between waveguide 30 and channel waveguide 60 in the now exposed evanescent field area of the optical signal transmitted along axis $a_0$ of waveguide 30. Channel waveguide 60 confines diffraction of optical energy coupled from waveguide 30 along the axes transverse to its axis of propagation $a_1$. Exemplary transverse axes are depicted in FIG. 1b, including perpendicular axes $a_2$ and $a_3$. Transverse or lateral diffraction of the coupled optical energy is limited by the optical boundaries 62, 64, 66 and 68 resulting from the confining, generally rectangular cross-sectional shape of channel waveguide 60.

Channel waveguide 60 therefore should be broadly construed to be in general any waveguide region which provides optical boundaries to confine lateral diffraction of the coupled optical energy along the axes transverse to propagation axis $a_1$ of the coupled optical energy in waveguide 60, which is aligned with propagation axis $a_0$ of waveguide 30. FIGS. 2a–c depict alternate configurations of channel waveguides which effect the necessary confinement of the coupled optical energy along these transverse axes. FIGS. 3 and beyond depict the passive and electro-optic theories of operation of the channel waveguide, and specific uses thereof.

FIG. 2a is a cross-sectional view of compound waveguide device 110 having a generally planar layer 170 deposited over substrate 20 (through which fiber 30 including core 40 and side-polished cladding 50 is run). Layer 170 comprises a channel waveguide 160 having a material with index of refraction "$n_0$" greater than the indices of refraction "n" of the material on either of its sides. Boundaries 162 and 164 between these regions of differing indices serve as the optical boundaries which confine the optical energy along the transverse axes. Upper boundary 166 and lower boundary 168 similarly confine the optical energy along the vertical axis.

Compound waveguide device 210 depicted in FIG. 2b similarly includes a layer 270 deposited over substrate 20 having running therethrough fiber 30 including core 40 and cladding 50. In this embodiment, channel waveguide 260 is formed by doping (via, for example, ion implantation) layer 270 such that a region is formed having an index of refraction $n_0$ greater than the index n of the remaining portions of layer 270. Optical boundaries 262 and 264 are formed on either side of channel 260 which effect a transverse confinement of the coupled optical energy, and, as set forth above, confinement is also effected along the vertical axis by surfaces 266 and 268.

Fabrication techniques which can be employed to realize the structure of FIG. 2a and FIG. 2b include, for example, chemical etching, ion implantation, laser ablation, masked deposition, and photolithography.

Compound waveguide device 310 depicted in FIG. 2c realizes a channel waveguide region 360 using a surface relief structure 366 on the upper surface of layer 370. This relief structure may be a separate layer deposited over layer 370 with the same or higher index than that of layer 370, or may be part of layer 370 itself and formed by polishing away adjacent regions 382 and 384. Transverse optical boundaries 362, 364 and 368 of channel waveguide 360 are realized using relief structures such are that depicted in FIG. 2c. One method of creating such relief structures can be found in now commonly-assigned U.S. Pat. No. 5,396,362 entitled "High Resolution Micromachining of Organic Crystals and Optical Modulators Formed Thereby," issued Mar. 7, 1995, the entirety of which is incorporated herein by reference. This relief structure is also known as a ridge waveguide. Other fabrication examples include chemical etching, laser ablation, marked deposition and photolithography.

Note that, as discussed above, the channel waveguide of the present invention in general is any structure which effects the requisite transverse lateral energy confinement. This optical confining region (e.g., 360) may or may not correspond directly to the physical structures used to implement the region. Hence, channel waveguide region 360 is depicted as possibly extending beyond these actual structures.

The height and width of the channel waveguide, and the interaction length $L_I$ are determined based on the operating wavelength as well as the performance parameters desired. Modeling the optical performance of compound waveguide structures is usually performed using various custom and/or commercially available simulation software.

Other exemplary fabrication techniques for forming the channel waveguide include polishing of bonded crystals ($LiNbO_3$, DAST), vacuum deposition of thin film dielectrics, or spin-on of soluble materials.

The optical characteristics of the above-described channel waveguide overlay devices improve upon those of standard planar or "slab" waveguide overlay devices as evidenced by the spectral response plot of FIG. 3. FIG. 3 is a comparison of the periodic bandstop characteristic 420 of the above-described channel waveguide overlay devices superimposed over the periodic bandstop characteristic 410 of a planar or slab waveguide overlay device. (These characteristics are for the optical signal propagating in fiber 30 following its interaction with channel waveguide 60.) Spectral characteristic 420 has a "sharper" response resulting in smaller transition regions in the bandstop areas than those of spectral characteristic 410. The difference in the spectral responses is represented as hashed region 430, which represents the spectral improvement of the channel waveguide over a planar or slab waveguide. This improved spectral response is due in large part to the minimization of lateral diffractive losses provided by the channel waveguide.

However, the absence of these lateral diffractive losses results in an entirely different theory of operation of the channel waveguide overlay device. At phase matching of the fiber mode and the waveguide mode, a planar or slab waveguide can be expected to cause a loss, exponentially proportional to $L_I$, as a result of lateral diffraction in the slab. Therefore, it is often a desirable characteristic of a planar or slab device that the interaction length $L_I$ be as long as possible, thereby resulting in a deeper bandstop response at the wavelength of interest. For a channel waveguide on the other hand, because the channel mode is transversely confined thereby eliminating lateral diffractive losses, the theory of operation is different. Additional physical design considerations result from this different theory of operation.

Figure 4:
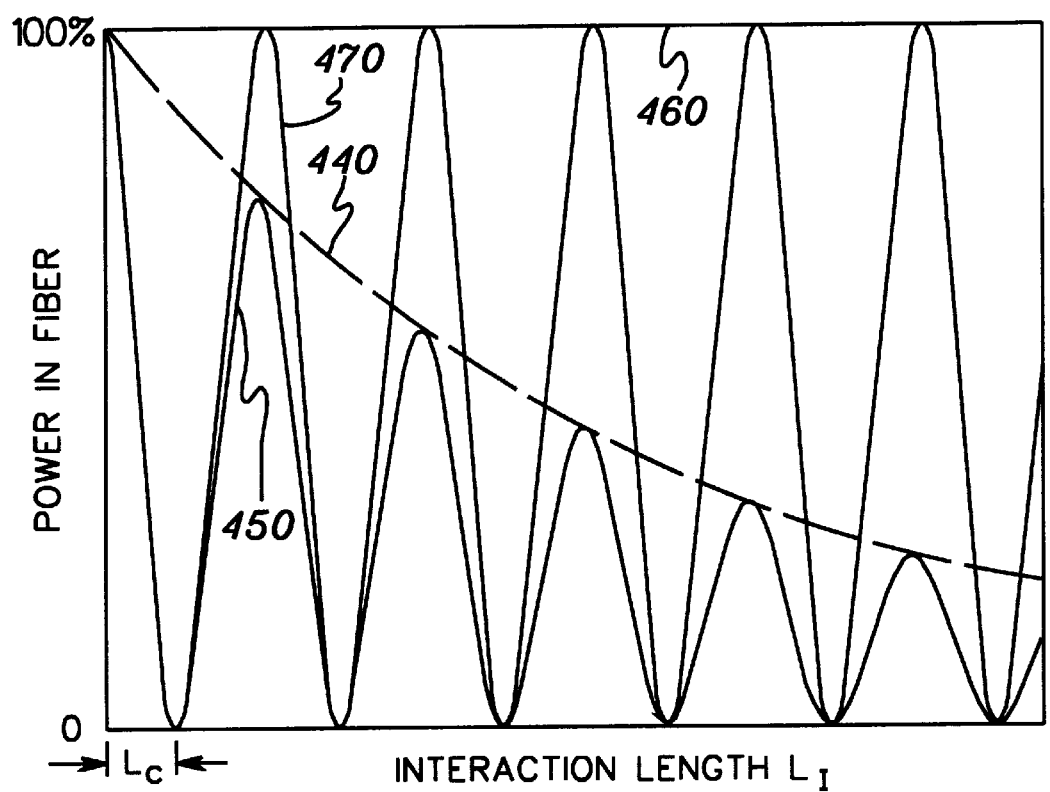
FIG. 4 is a plot of the energy transfer functions along the length of the channel waveguide disclosed herein and a planar or slab waveguide.

These issues can be better understood by examining FIG. 4, which is a plot of the power in the optical fiber versus the interaction length $L_I$, at a fixed wavelength of interest. Power curve 450 represents the power transmitted through the optical fiber in the presence of a planar or slab overlay waveguide. Power curve 470 represents the power in the optical fiber using a channel waveguide. Both power curves, or "energy transfer functions" 450 and 470 are periodic in nature along the interaction length $L_I$.

Power curve 450 decays along curve 440 as the interaction length increases, thus indicating a decaying loss in power in the optical fiber along the interaction length. Therefore, for a planar or slab waveguide, it is generally desirable to increase the interaction length to or beyond a point at which the lateral losses provide a desired attenuation level at the wavelength of interest. This is represented as the depth of one of the notches shown in FIG. 3.

However, for a channel waveguide system, the mode is confined, resulting in little or no lateral diffractive losses. Power curve 470, though oscillating, exhibits no such decaying loss as the interaction length increases. This is represented by the substantially horizontal curve 460. Because of the absence of the energy decay, the periodic nature of the energy transfer in a channel waveguide system is utilized for signal attenuation. The interaction length of the channel waveguide must be carefully controlled to correspond, for example, to an odd multiple of $L_C$, which will represent two points in the oscillating energy transfer curve 470 between which power in the optical fiber falls from a high level to a low level. The amount of power coupled to the channel waveguide (i.e., the depths of the notches in FIG. 3) is therefore a direct function of the interaction length $L_I$ and can be controlled by designing the interaction length carefully with this oscillating energy transfer function in mind. Those skilled in the art will recognize that this interaction length $L_I$ can be controlled, in the side-polished fiber optic embodiment, by careful control of the radius (R) of curvature of the fiber optic cable as it passes through substrate 20 in FIG. 1, as well as the depth of the polishing of the fiber or the design of the overlay. In one example, the radius of curvature (R) may be 50 cm, and $L_I$ may be 5 mm.

Based upon the cross-sectional shapes of the channel waveguides depicted in FIGS. 1 and 2 above, as well as the particular interaction length $L_I$ which must now be designed into the device, more complex fabrication methods are required. However, better coupling characteristics, including a tighter spectral response, are achieved as a result. The selection of materials used to form a passive channel waveguide is guided by some of the same considerations discussed below for electro-optic channel waveguides, and some possible materials are also listed below. The materials should in general be transparent at the wavelength of interest and should propagate (not absorb) light.

As an example, for a 10 $\mu$m channel overlay of index 1.457 surrounded by an index of 1.000 (air), coupled to a 50 cm radius curved fiber with a 10 $\mu$m core diameter and an index of 1.448 in a cladding of index 1.447, half-wave coupling between the fiber and mode 3 of the overlay occurs at a core-overlay separation of 9 $\mu$m, and full-wave coupling occurs near 6 $\mu$m.

Discussed above is the use of a channel waveguide in its passive mode, wherein its coupling characteristics are determined primarily by its physical geometry and material. Attention is now turned to the device's physical configuration, and its theory of operation, when the above-discussed channel waveguide is used in an electro-optically tunable configuration, assuming it is fabricated from an electro-optically active material.

FIGS. 5a–b generally correspond to the channel waveguide configuration of FIGS. 1a–c discussed above. In this configuration, channel waveguide 560 comprises an elongated waveguide having a rectangular cross-section. Using this configuration, electrodes 510 and 520 can be placed on either side of waveguide 560 (and possibly separated from the waveguide itself using intervening cladding layers, as shown) for applying an electric field thereto.

Alternatively, and as shown in FIGS. 6a–b, channel waveguide 560 may be part of a planar layer of material 570. This configuration generally corresponds to the configurations of FIGS. 2a–c discussed above. In this configuration, planar layer 570 can be interposed between transparent electrodes 512 and 522. Rather than transparent electrodes, and with reference to FIGS. 7a–b, co-planar electrodes 514 and 524 can be placed over layer 570.

In general, the applied electric field, material electro-optic axis, and polarization of the propagating optical signal should be aligned.

Therefore, channel waveguides can support the application of electrodes on the side surfaces thereof (FIGS. 5a–b), as well as planar arrangements of electrodes known for planar or slab waveguides (FIGS. 6a–b and 7a–b).

The channel geometry thus allows electrode structures to be reconfigured to provide enhanced field excitation of the waveguide. This improvement can result from both the physical repositioning of the electrodes themselves, and improved dielectric boundary conditions. As a direct result, if the effective field excitation of the waveguide is enhanced by a factor E, the linear spectral tuning of the waveguide achievable with a given electrical voltage also increases by E. (It should be noted that the length of the electrodes should be at least as long as the interaction length $L_I$, and preferably much longer than $L_f$.) As discussed above, $L_f$ is typically much shorter than the length of the channel overlay waveguide.

Figure 8A:
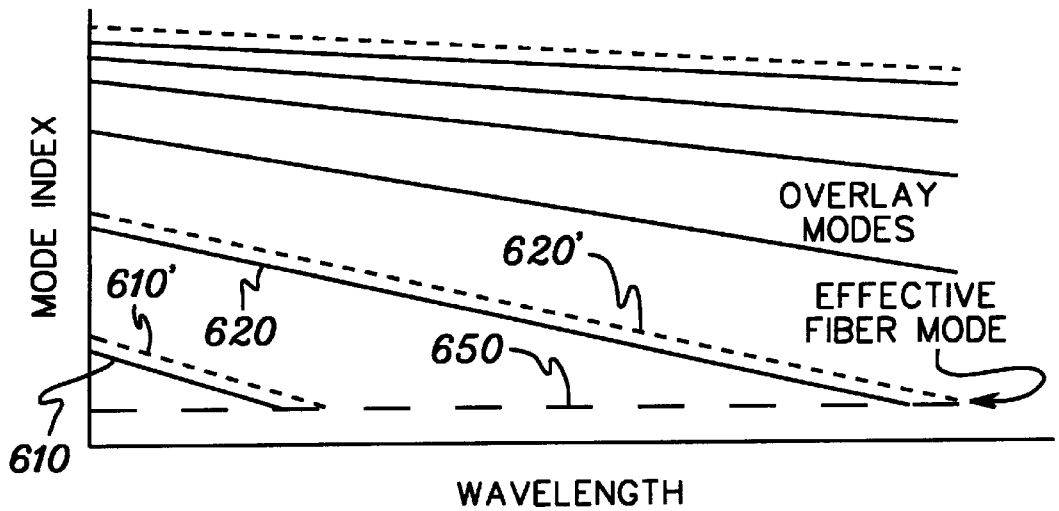
FIGS. 8a–b are plots of the electro-optic activity of the compound waveguide disclosed herein, and the resultant spectral characteristic of the optical signal propagating along the fiber optic following its interaction with the channel waveguide.
Figure 8B:
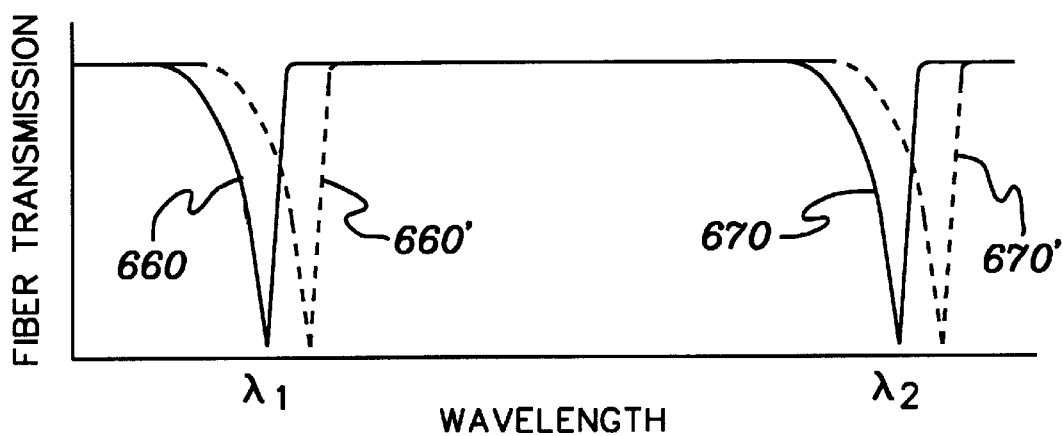

The spectral response of the channel overlay waveguide can be electro-optically tuned, as shown in FIGS. 8a–b. A channel overlay waveguide is preferably multi-mode for fixed values of wavelength. For example, at wavelength $\lambda_1$, the multi-mode waveguide has six modes (having mode indices as depicted in FIG. 8a) including modes 610 and 620. Mode 610 is the highest order mode and coupling of the effective fiber mode 650 to mode 610 causes spectral notch 660 centered at "coupling" wavelength $\lambda_1$, where its mode index intersects with the effective fiber index 650. Similarly, mode 620 is the second highest order mode and causes spectral notch 670 at a coupling wavelength $\lambda_2$ where its mode index intersects with the fiber mode index 650. (The slope of the mode index curves in FIG. 8a is due to dispersion within the waveguide. Multimode waveguides are preferable because they offer high dispersion. The highest order mode, due to its high dispersion, offers a larger "slope" and therefore a resultant sharper spectral response. This mode is therefore preferable, and coupling wavelength $\lambda_1$ is the preferable wavelength region of operation.) The electro-optic effect, created by using an electro-optic material in the waveguide and imposing thereon an electric field, causes shifts in the mode indices, represented as 610' and 620'. The electro-optic shifts in the mode indices cause a corresponding shift in the spectral response, which is shown as shifted notches 660' and 670' in FIG. 8b.

Exemplary filter and related applications of the above-discussed compound waveguide are disclosed in the above-incorporated U.S. Patent Application entitled "Compound Optical Waveguide and Filter Applications Thereof."

Exemplary amplifier and related applications of the above-discussed compound waveguide are disclosed in the above-incorporated U.S. Patent Application entitled "Optical Amplifier and Process for Amplifying an Optical Signal Propagating in a Fiber Optic."

One exemplary use of an electro-optically active channel waveguide, the characteristics of which are depicted in FIGS. 8a–b, is as an intensity modulator of the signal transmitted in the fiber.

Figure 9A:
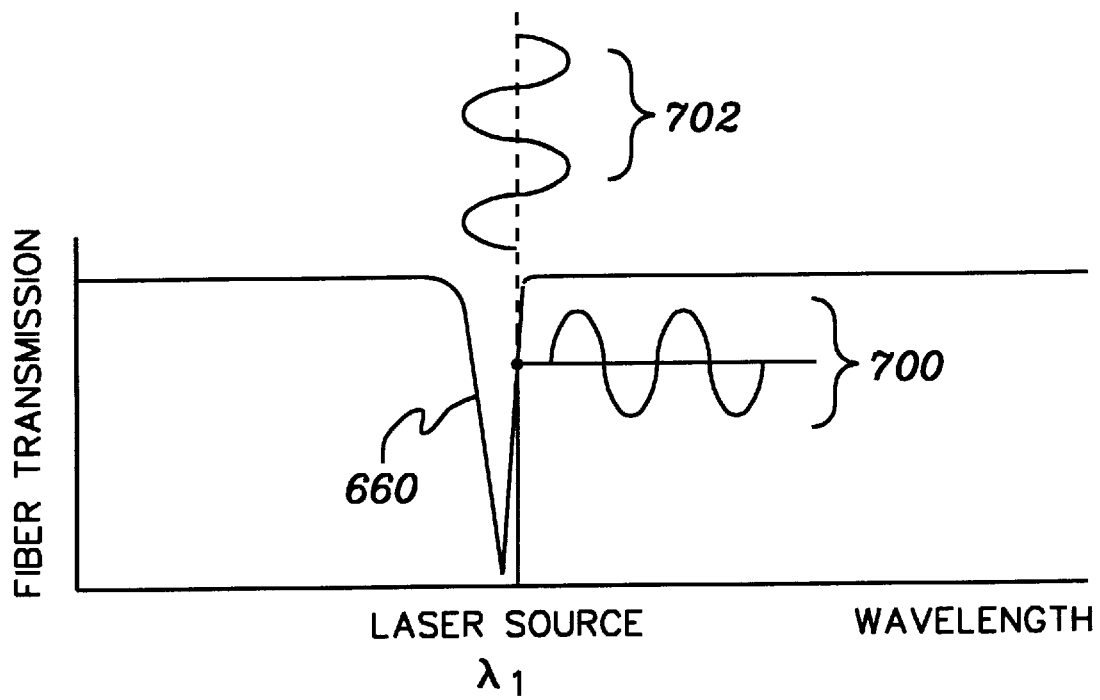
FIG. 9a is a plot of the interaction between the spectral characteristic of a compound waveguide modulator and the optical signal propagating through the fiber optic upon which is imparted a resultant optical modulation.

With reference to FIG. 9a, the compound waveguide can be configured as an intensity modulator by electro-optically tuning the spectral response such that one of the sharp edges of the bandstop spectral characteristic coincides with a fixed wavelength optical fiber signal source, e.g., 1310 nm. An intensity modulation is then impressed onto the fixed wavelength signal by toggling or shifting the spectral response via an application of an electric field to the channel overlay waveguide. As discussed above with reference to FIGS. 8a–b, this electric field induces a refractive index change in the channel which shifts the position (represented graphically as curve 702) of the sharp resonance 660 in the spectral response. The response oscillates about the fixed wavelength source so that an amplitude modulation (represented graphically as curve 700) occurs. The excursion of the modulation and required drive voltage are determined by the gradient of the sharp edge of the resonance in the spectral response, and in accordance with the discussions below.

The following Eigenvalue Waveguide Equation relates the thickness d of the waveguide (having an index of refraction $n_0$ at wavelength $\lambda$) for a typical planar or slab waveguide:

$$\frac{2\pi d}{\lambda} \sqrt{n_o^2 - n_e^2} = m\pi + \phi_1 + \phi_3$$

where m is the mode order, $n_e$ is the fiber mode index, and $\Phi_1$ and $\Phi_3$ are phase terms of an overlying superstrate and an underlying substrate. For a standard device, the change in wavelength on the sharp side of a resonance may be 1.5 nm for a 10–90% intensity modulation. The corresponding index change required in the waveguide can be determined from a differentiation of the above waveguide equation which results in:

$$\delta n_o = \frac{(n_o^2 - n_e^2)}{\lambda n_o} \delta \lambda$$

For $n_0$=2.2, an index change of $1.2 \times 10^{-3}$ is necessary for a 1.5 nm change (assuming $\lambda$=1550 nm). For an electro-optic material, the index change induced by an applied voltage V is given by:

$$\delta n_o = \frac{n_o^3}{2} r_{ij} \frac{V}{d}$$

where $r_{ij}$ is the associated electro-optic response or coefficient, and d is the thickness of the waveguide. For 15 $\mu$m LiNbO$_3$ ($r_{33}$ =30.8 pm/V), an applied voltage of 110 volts is required for a 10–90% intensity modulation.

However, unlike the conventional 1.5 nm change in wavelength for 10–90% intensity modulation, the sharper transition regions of the improved spectral response of the channel waveguide disclosed herein (depicted in FIG. 3) result in a corresponding decrease in the change in wavelength necessary for the same modulation. This decreased change in wavelength ($\delta\lambda$) is proportional to, and therefore decreases, the amount of applied voltage necessary for this modulation. The enhancement of the device's spectral response therefore directly results in a lower drive voltage.

The short interaction length and the non-intrusive fiber architecture make this type of modulator extremely attractive for high frequency, stable operation in existing fiber optic networks.

In some applications, organic salts (see, e.g., above-incorporated U.S. Pat. No. 5,396,362) are preferred materials for such modulators because they have a relatively low dielectric constant ($\epsilon$) but have a high electro-optic response (Pockels coefficient r). Such modulators are intended for use above 1 GHz baseband bandwidths, and in fact have been considered applicable for modulating baseband bandwidths on the order of 100 GHz. The selection of a preferred material is impacted by the choice of the baseband modulating signal bandwidth and the optical carrier center wavelength. Potential channel waveguide materials include LiNbO$_3$, KNbO$_3$, SrBaNbO$_3$, DAST, MOST (see, e.g., above-incorporated U.S. Pat. No. 5,396,362) and DASM (see, e.g., commonly-assigned U.S. Pat. No. 5,194,984, the entirety of which is incorporated herein by reference). Those skilled in the art will recognize that, depending upon the particular application, certain materials may be preferred over others, in view of their electro-optic responses (r), as well as their dielectric constants ($\epsilon$).

Figure 9B:
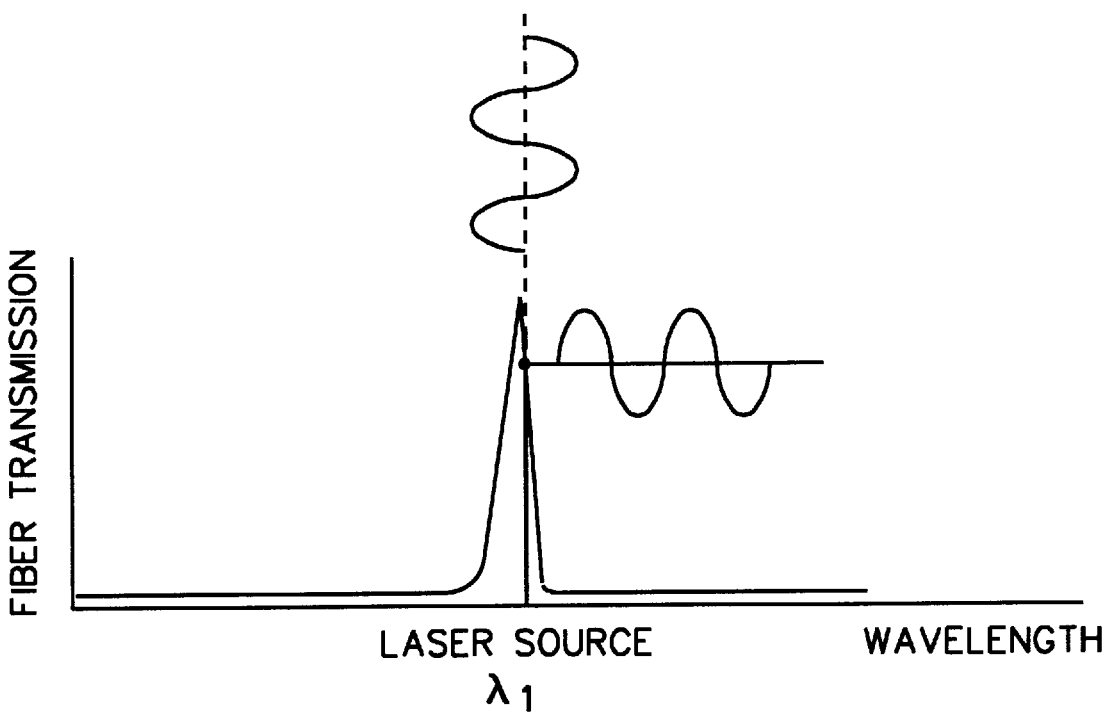
FIG. 9b depicts a similar interaction but with a modified, inverted spectral characteristic.
Figures 10A, 10B:
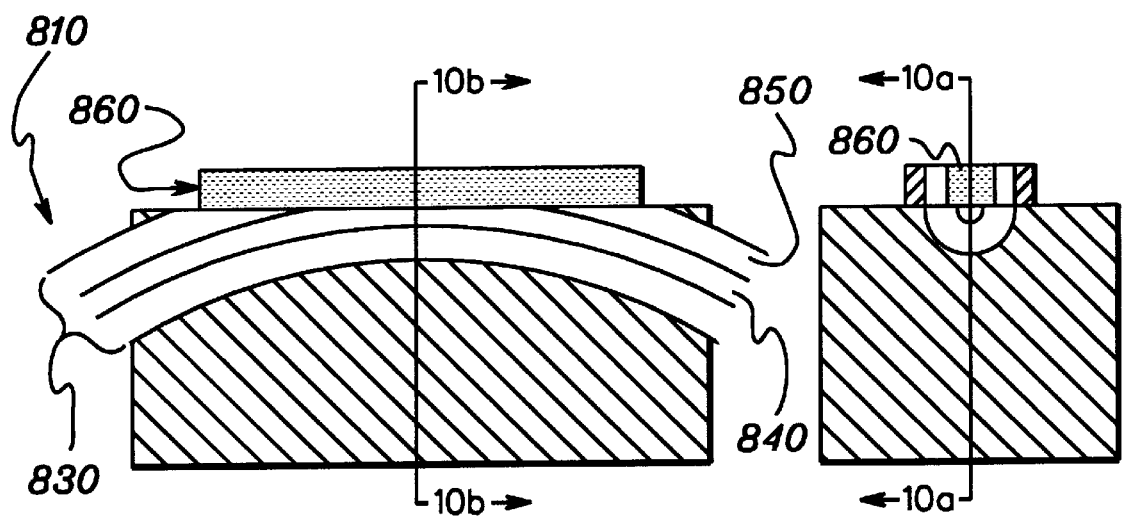
FIGS. 10a–b are cross-sectional views of an alternate embodiment of the side-polished fiber optic compound waveguide of the present invention wherein the fiber optic is side-polished into its core.
Figure 11:
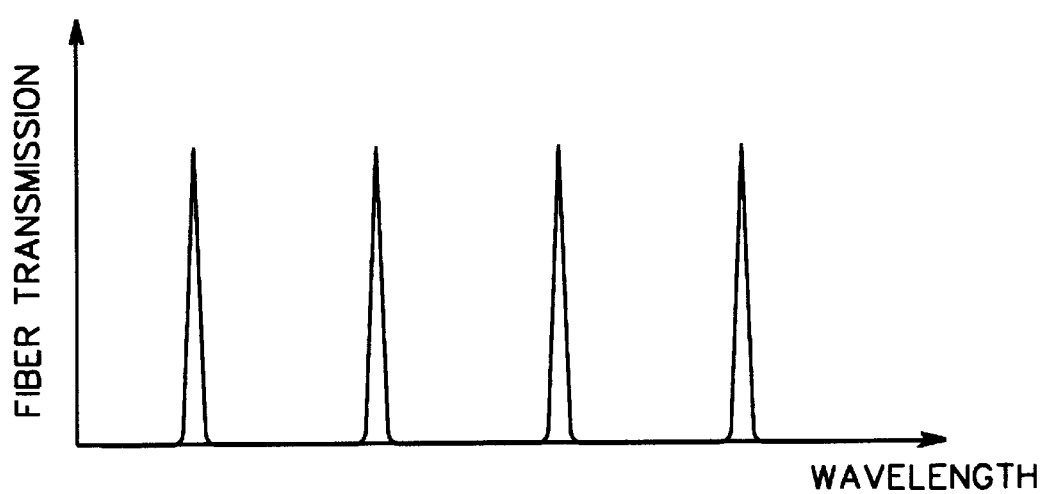
FIG. 11 depicts the spectral characteristic of the optical signal transmitted in the fiber optic following its interaction with the alternate compound waveguide of FIGS. 10a–b.

FIGS. 10a–b depict a modified embodiment 810 of the modulator for modulating a signal propagating in fiber 830 including core 840 and cladding 850. In addition to removing part of cladding 850, part of the fiber core 840 itself is removed by the side-polishing process. By removing part of the fiber core 840 itself, the fiber becomes cut off prior to optically contacting the channel overlay 860. The spectral response therefore becomes that of a periodic bandpass filter, wherein only narrow bands of input light are allowed to be transmitted down the fiber. The spectral response of the fiber transmission is depicted in FIG. 11. This modified embodiment differs from the embodiments discussed above in at least two ways: (i) the fiber core is partially removed so that the fiber exhibits high attenuation of input light due to its radiation out of the core; and (ii) the spectral response is approximately inverted, because the selective coupling, based on the phased matching of the fiber and channel waveguide modes, restores signal transmission through the fiber at the discreet wavelength bands shown in FIG. 11. FIG. 9b shows modulation operation possible using this inverted spectral response.

The use of a channel overlay waveguide rather than a standard planar or slab overlay waveguide enhances device performance by reducing diffractive losses, providing a sharpened spectral response, and therefore reducing drive voltages, while still maintaining the attractive all-fiber (non-intrusive) architecture. As discussed above, the channel waveguide also allows for variations in electrode geometry. The modulator formed from the channel overlay waveguide is capable of high speed operation, and is also non-interferometric, thereby reducing stability issues. The modulation depth is dependent on the particular electro-optic material chosen. Good linearity of modulation is possible, and both analog and digital modulation are possible.

While the invention has been particularly shown and described with reference to preferred embodiment(s) thereof, it will be understood by those skilled in the art that various changes in form and details may be made therein without departing from the spirit and scope of the invention.

What is claimed is:

1. An optical intensity modulator, comprising:
    a substrate for holding at least a portion of a first, elongate waveguide propagating an optical signal along a propagation axis thereof; and
    a second, channel waveguide positioned in optical proximity to the portion of the first waveguide, said second waveguide having a first, propagation axis aligned with the propagation axis of the portion of the first waveguide, said second waveguide further having a coupling surface through which optical energy is coupled to or from the optical signal propagating in the first waveguide to thereby intensity modulate the optical signal.

2. The optical modulator of claim 1, wherein said second waveguide is shaped to confine distribution of the optical energy therein along a second axis perpendicular to both its first axis and a third axis normal to its coupling surface.

3. The optical modulator of claim 2, wherein said second waveguide is elongated along its first axis and has a generally rectangular cross-section and therefore a first pair of opposing optical boundaries disposed generally perpendicular to its coupling surface, the first pair of opposing optical boundaries confining the distribution of the optical energy in said second waveguide along its second axis.

4. The optical modulator of claim 3, wherein said second waveguide includes a second pair of opposing optical boundaries a first of which comprises the coupling surface, the second optical boundary of the second pair of opposing optical boundaries confining the distribution of the optical energy in said second waveguide along its third axis.

5. The optical modulator of claim 4, further comprising:
    a pair of electrodes each being disposed along a respective boundary of the first pair of opposing optical boundaries of said second waveguide, the pair of electrodes for applying an electric field between the first pair of opposing optical boundaries, said electric field controlling the coupling of said optical energy by said second waveguide to thereby modulate the optical signal.

6. The optical modulator of claim 1, wherein said second waveguide is shaped to confine distribution of the optical energy therein along axes of said second waveguide transverse to its first, propagation axis.

7. The optical modulator of claim 6, wherein said second waveguide comprises an optically bounded first region within a layer disposed over the substrate, the first region having an index of refraction different than that of other regions of said layer, wherein optical boundaries formed by the intersections of the first region and the other regions confine the distribution of the optical energy within said second waveguide along the axes of said second waveguide transverse to its first, propagation axis.

8. The optical modulator of claim 6, wherein said second waveguide comprises an optically bounded region within a layer disposed over the substrate, the optically bounded region being formed by a surface relief structure on said layer.

9. The optical modulator of claim 1, wherein the first, elongate waveguide comprises a fiber waveguide, and wherein the portion of the first waveguide comprises a side-polished portion of the fiber waveguide, the coupling surface of the second, channel waveguide evanescently coupling the optical energy to or from the side-polished portion of the fiber waveguide.

10. The optical modulator of claim 9, wherein the fiber waveguide comprises a core region and a surrounding cladding region, and wherein the fiber waveguide is side-polished into the cladding region but not the core region.

11. The optical modulator of claim 9, wherein the fiber waveguide comprises a core region and a surrounding cladding region, and wherein the fiber waveguide is side-polished through the cladding region and into the core region.

12. The optical modulator of claim 1, wherein said second waveguide is formed from an electro-optically active material, the modulator further comprising:
    at least one electrode positioned to apply an electric field to said second waveguide to electrically control the coupling of the optical energy by said second waveguide to thereby modulate the optical signal.

13. The optical modulator of claim 12, wherein the optical signal comprises a fixed wavelength signal and wherein the electric field controls a coupling wavelength at which the coupling of the optical energy by said second waveguide occurs, the control of the coupling wavelength about the fixed wavelength of the optical signal by the electric field imparting an intensity modulation upon the optical signal.

14. The optical modulator of claim 13, wherein said second waveguide comprises a multimode waveguide having a high order mode, the electric field controlling the coupling wavelength at which the high order mode index corresponds to the first waveguide's index, thereby imparting the intensity modulation upon the optical signal.

15. The optical modulator of claim 1, wherein the optical energy is coupled to or from said first waveguide by said second waveguide along an interaction area between said second waveguide and said first waveguide, the optical energy being coupled according to an oscillating energy transfer function, an interaction length of the interaction area being determined as a function of the oscillating energy transfer function.

16. The optical modulator of claim 15, wherein the interaction length of the interaction area is substantially equal to an odd multiple of one half of the period of the oscillating energy transfer function, such that the optical energy coupled from the optical signal by said second waveguide rises from a near minimum to a near maximum value along the interaction length.

17. An optical intensity modulator for intensity modulating an optical signal propagating along a propagation axis of a side-polished fiber optic by coupling optical energy to or from the optical signal, comprising:

a multimode channel waveguide having a propagation axis alignable with the propagation axis of the side-polished fiber optic, said multimode channel waveguide including a coupling surface through which the optical energy is coupled to or from the optical signal propagating in the side-polished fiber optic, thereby intensity modulating the optical signal the multimode channel waveguide confining distribution of the optical energy therein along axes transverse to its propagation axis.

18. The optical modulator of claim 17, wherein the optical energy is coupled to or from the side-polished fiber optic by said multimode channel waveguide along an interaction area between the multimode channel waveguide and the fiber optic, the optical energy being coupled according to an oscillating energy transfer function, an interaction length of the interaction area being determined as a function of the oscillating energy transfer function.

19. The optical modulator of claim 18, wherein the interaction length of the interaction area is substantially equal to an odd multiple of one half of the period of the oscillating energy transfer function, such that the optical energy coupled from the optical signal by the channel waveguide rises from a near minimum to a near maximum value along the interaction length.

20. The optical modulator of claim 17, wherein said multimode channel waveguide comprises an optically bounded first region within a layer, the first region having an index of refraction different than that of other regions of said layer, wherein optical boundaries formed by the intersections of the first region and the other regions confine the distribution of the optical energy within said multimode channel waveguide along the axes of said multimode channel waveguide transverse to its propagation axis.

21. The optical modulator of claim 17, wherein said multimode channel waveguide comprises an optically bounded region within a layer, the optically bounded region being formed by a surface relief structure on said layer.

22. The optical modulator of claim 17, wherein said multimode channel waveguide is formed from an electro-optically active material, the device further comprising:

at least one electrode positioned to apply an electric field to said multimode channel waveguide to electrically control the coupling of the optical energy by said multimode channel waveguide to thereby modulate the optical signal.

23. The optical modulator of claim 22, wherein the optical signal comprises a fixed wavelength signal and wherein the electric field controls a coupling wavelength at which the coupling of the optical energy by said second waveguide occurs, the control of the coupling wavelength about the fixed wavelength of the optical signal by the electric field imparting an intensity modulation upon the optical signal.

24. The optical modulator of claim 23, wherein said multimode channel waveguide comprises a high order mode, the electric field controlling the coupling wavelength at which the high order mode index corresponds to the first waveguide's mode index, thereby imparting the intensity modulation upon the optical signal.

25. A method for intensity modulating an optical signal propagating along a first propagation axis of a first, elongate waveguide by coupling optical energy to or from the optical signal, comprising:

(a) placing a second, multimode channel waveguide in optical proximity to a portion of said first waveguide; and (b) evanescently coupling the optical energy to or from the optical signal through a coupling surface of said second, multimode channel waveguide thereby intensity modulating the optical signal.

26. The method of claim 25, wherein said evanescently coupling (b) comprises coupling the optical energy according to an oscillating energy transfer function along an interaction area between the portion of said first waveguide and said second waveguide.

27. The method of claim 26, wherein said evanescently coupling (b) comprises coupling the optical energy along an interaction length of said interaction area, the interaction length being substantially equal to an odd multiple of one half of the period the oscillating energy transfer function, such that the optical energy coupled from the optical signal by said second waveguide rises from a near minimum value to a near maximum value along the interaction length.

28. The method of claim 25, wherein said evanescently coupling (b) includes electrically controlling coupling characteristics of said second waveguide by applying an electric field thereto and thereby modulating the optical signal according to the electric field.

29. The method of claim 28, wherein the coupling characteristics controlled by said electrically controlling include a coupling wavelength at which the optical energy is coupled to or from the optical signal.

30. The method of claim 29, wherein said second waveguide comprises a high order mode and wherein the coupling wavelength comprises the wavelength at which the high order mode index of refraction corresponds to the index of refraction of the first waveguide.

31. The method of claim 30, wherein said electrically controlling includes controlling the high order mode index of refraction with the electric field and thereby controlling the coupling wavelength.

32. The method of claim 25, wherein said first waveguide comprises a fiber waveguide and wherein the portion of said first waveguide comprises a side-polished portion of the fiber waveguide.

* * * * *